United States Patent
Schuepbach

(10) Patent No.: US 6,546,758 B1
(45) Date of Patent: Apr. 15, 2003

(54) MULTI-CHAMBER FIBER COOLING APPARATUS

(75) Inventor: Olivier Schuepbach, Hickory, NC (US)

(73) Assignee: Alcatel, Paris (FR)

( * ) Notice: Subject to any disclaimer, the term of this patent is extended or adjusted under 35 U.S.C. 154(b) by 227 days.

(21) Appl. No.: 09/639,344

(22) Filed: Aug. 16, 2000

(51) Int. Cl.⁷ .................................. C03B 37/023
(52) U.S. Cl. .................... 65/510; 65/510; 65/511; 65/512; 65/513; 62/63
(58) Field of Search .................. 65/513, 512, 434, 65/510, 511; 62/63

(56) References Cited

U.S. PATENT DOCUMENTS

| | | | |
|---|---|---|---|
| 2,983,497 A | * 5/1961 | Dailey ........................ 62/63 |
| 3,440,685 A | 4/1969 | Constantakis et al. |
| 3,574,581 A | * 4/1971 | Strickland ............... 425/382 R |
| 4,000,625 A | * 1/1977 | Beerens et al. ............ 164/444 |
| 4,050,915 A | 9/1977 | Brown |
| 4,514,205 A | 4/1985 | Darcangelo et al. |
| 4,761,168 A | * 8/1988 | Blyler et al. ................... 65/434 |
| 4,792,347 A | 12/1988 | Deneka et al. |
| 4,824,457 A | 4/1989 | Jensen |
| 4,838,918 A | * 6/1989 | Vaughan et al. ............... 65/157 |
| 4,966,615 A | * 10/1990 | Linden et al. ................ 65/434 |
| 5,043,001 A | 8/1991 | Cain et al. |
| 5,314,515 A | 5/1994 | Cain |
| 5,568,728 A | 10/1996 | Sapsford |
| 5,897,682 A | 4/1999 | Koaizawa et al. |
| 6,370,920 B1 | * 4/2002 | Overton et al. ............... 65/510 |

FOREIGN PATENT DOCUMENTS

| | | | |
|---|---|---|---|
| DE | 3919953 | * 12/1990 | ............ 65/512 |
| EP | 0 261 856 A3 | 3/1988 | |
| EP | 0 887 319 A1 | 12/1998 | |
| GB | 2 287 244 A | 9/1995 | |
| JP | 03 065 535 A | 3/1991 | |
| JP | 5-186238 | * 7/1993 | ............ 65/434 |

OTHER PUBLICATIONS

Patent Abstracts of Japan, vol. 1998, No. 09, Jul. 31, 1998 & No Copy of Patent Provided.
Unit for Taking Up Optical Fiber, JP54131042, Oct. 11, 1979, Motohiro, Japanese Patent Abstract with English translation.

* cited by examiner

Primary Examiner—John Hoffmann
(74) Attorney, Agent, or Firm—Sughrue Mion, PLLC

(57) ABSTRACT

A method and device for reducing the temperature of an optical fiber wherein a housing body is provided a plurality of inner cooling chambers which are-, partitioned from each other by a plurality of partition walls. An axial through hole extends through each of the inner cooling chambers from an upper end of the housing body to a lower end of the housing body for the axial passage of an optical fiber therethough. A plurality of gas injection holes corresponding to the inner cooling chambers are provided in a side wall of the housing body for injecting gas into the inner cooling chambers. A plurality of coolant pipes through which a liquid coolant is circulated extend through each of the inner cooling chambers from the upper end to the lower end of the housing body. The coolant pipes are disposed between the gas injection holes and the axial through hole so that the gas which is injected into the inner cooling chambers via the gas injection holes is not blown directly against the fiber.

11 Claims, 3 Drawing Sheets

MULTI-CHAMBER FIBER COOLING APPARATUS

FIELD OF THE INVENTION

The present invention relates to a method and apparatus for reducing the temperature of an optical fiber. In particular, the present invention relates to an optical fiber cooling apparatus comprising a plurality of separate inner cooling chambers through which a plurality of refrigerant tubes extend to form an enlarged heat exchange surface.

BACKGROUND OF THE INVENTION

When drawing an optical fiber at high speed, rapid cooling of the optical fiber is important to achieve a good coating application on the fiber and good optical equality of the fiber. In particular, if the temperature of the optical fiber is elevated during the coating application, the coating diameter decreases, control of the coated fiber diameter decreases, and instability of the coating application increases (e.g., loss of coating, lumps, neck-downs, etc.). Further, a high draw speed of the optical fiber is necessary to increase productivity and decrease production cost.

In order to produce an optical fiber, an optical fiber base material is drawn while being heated by a furnace. The drawn optical fiber then is passed through a cooling device in order to reduce the temperature of the fiber before it is coated with a protective resin. However, the draw speed of the optical fiber is limited by the rate of cooling of the optical fiber. That is, as the draw speed of the optical fiber increases, the cooling capacity of the cooling device must also be increased since the temperature of the optical fiber is increased.

Conventional cooling devices typically include a housing having an inner chamber containing a gaseous medium (e.g., air or helium) which is utilized to cool an optical fiber as it transported through the chamber. Further, the housing may include pipes through which a liquid refrigerant flows. The pipes are used to cool the gaseous medium which fills the inner chamber of the cooling tube in order to remove heat from the optical fiber. However, conventional cooling devices typically require a large amount of heat transfer fluid and are very long thereby requiring a large amount of space on a draw tower. Further, the opening or hole in the conventional cooling devices through which the optical fiber passes is so small that vibrations in the fiber may cause the fiber to touch the sides of the heat transfer apparatuses.

U.S. Pat. No. 5,568,728 discloses a filament cooler including an axial through hole which passes through a plurality of successive inner hemispherical wells or chambers. As shown in FIG. 4, copper pipes 14∫17 are provided for carrying cooling water which reduces the temperature of four strips 18–20 of aluminum which are bolted together around copper pipes to form housing body of the filament cooler. That is, the copper pipes 14–17 are disposed outside of hemispherical wells 29 so that the walls of the hemispherical wells 29 are chilled rather than the helium gas directly. Helium gas is tangentially injected into and extracted from the spherical chambers to induce a cyclonic or swirling gas flow. However, the turbulent gas flow can cause the optical fiber to vibrate or become laterally displaced so that the optical fiber may contact the walls of the of the axial through hole through which the optical fiber passes thereby damaging the optical fiber.

In view of the disadvantages of conventional cooling devices, it is an object of the present invention to provide an optical fiber cooling apparatus having a large heat transfer surface with reduced heat transfer fluid consumption.

It is yet another object of the present invention to provide an optical fiber cooling apparatus having a reduced risk of the optical fiber being damage by contacting the inner walls of the cooling apparatus.

It is a further object of the present invention to provide an optical fiber cooling apparatus having a shorter length in order to save space on the draw tower and enable high draw speeds.

SUMMARY OF THE INVENTION

The present invention is adapted to achieve the foregoing objects. In accomplishing these objects, the present invention provides an optical fiber cooling device comprising a plurality of inner chambers through which an optical fiber is sequentially transported.

According to the present invention, there is provided a cooling device comprising a housing body having a plurality of inner cooling chambers which are partitioned from each other by a plurality of partition walls. An axial through hole extends through each of the inner cooling chambers from an upper end of the housing body to a lower end of the housing body for the axial passage of an optical fiber therethough. A plurality of gas injection holes corresponding to the inner cooling chambers are provided in a side wall of the housing body for injecting gas into the inner cooling chambers. A plurality of coolant pipes through which a liquid coolant is circulated extend through each of the inner cooling chambers from the upper end to the lower end of the housing body. The coolant pipes are disposed between the gas injection holes and the axial through hole so that the gas which is injected into the inner cooling chambers via the gas injection holes is not blown directly against the fiber. In other words, the coolant pipes disrupt the flow of the gas as it is injected into the inner cooling chambers thereby preventing the gas blowing directly on the optical fiber. As a result, vibration of the optical fiber is preventing thereby allowing a smaller through hole to be utilized.

The above and other features of the invention including various and novel details of construction and process steps will now be more particularly described with reference to the accompanying drawings and pointed out in the claims. It will be understood that the particular apparatus and method for cooling an optical fiber embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

These and other features, aspects and advantages of the present invention will become better understood with reference to the following detailed description, appended claims, and accompanying drawings, wherein:

DESCRIPTION OF THE PREFERRED EMBODIMENTS

Figure 1:
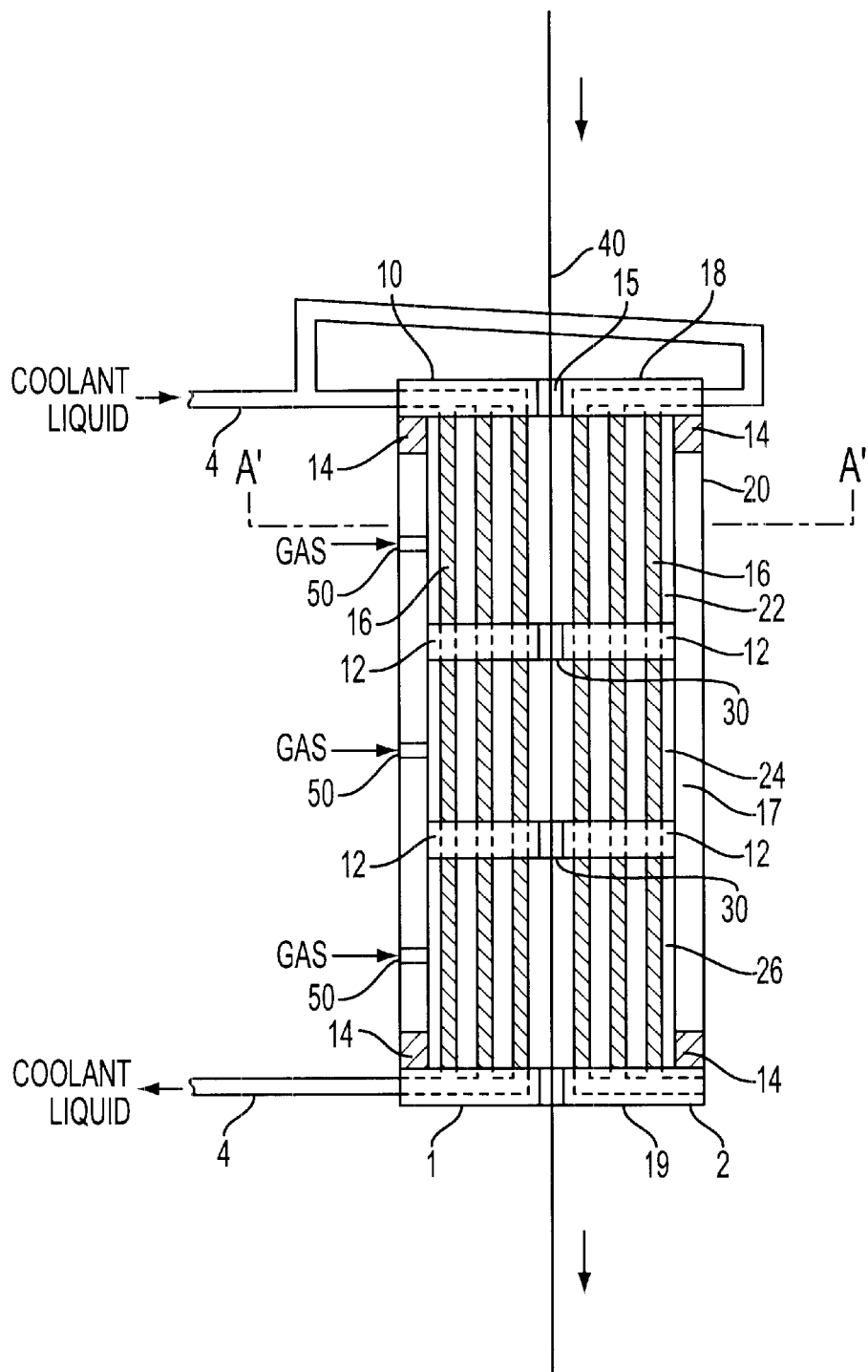
FIG. 1 illustrates a plan view of the fiber cooling apparatus of the present invention.
Figure 2:
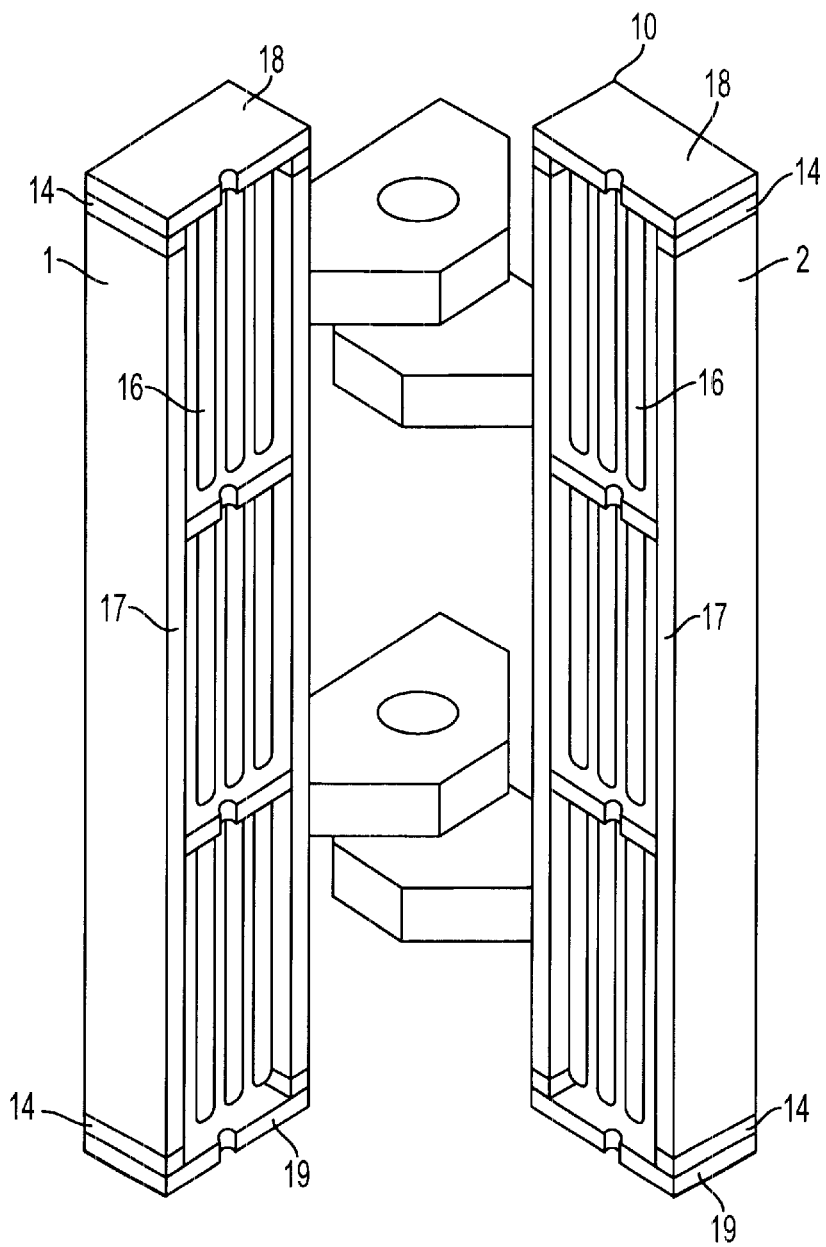
FIG. 2 illustrates a schematic view of fiber cooling apparatus of the present invention.

Referring to FIGS. 1 and 2, a drawn optical fiber 40 is vertically provided to a cooling device 10 comprising two hingedly connected half shells 1 and 2 which are maintained in a closed position during an optical fiber cooling operation. In the closed position, the half shells form a housing body 20 having a series of three inner cooling chambers 22, 24 and 26, an upper end portion 18, a lower end portion 19 and a plurality of side walls 17. An axial through hole 15 extends from the upper end portion 18 of the housing body 20 wherein an optical fiber 40 enters the cooling tube, to the lower end portion 19 of the housing body 20 wherein the optical fiber 40 exits the cooling tube. From the upper end portion 18 of the housing body 20, the axial through hole 15 leads to the first inner cooling chamber 22 of the series of three inner cooling chambers 22, 24 and 26. The inner cooling chambers 22, 24 and 26 are separated from each other by separating walls 12 formed from an insulating material (e.g., Teflon). Each of the separating walls 12 are provided with a central opening 30 corresponding to the axial through hole 15 thereby allowing the optical fiber 40 to be sequentially transported through each of the inner cooling chambers 22, 24 and 26.

Each of the inner cooling chambers is filled with a gaseous medium which injected though gas injection holes 50 corresponding to each of the inner cooling chambers 22, 24 and 26. In the preferred embodiment, helium is utilized as the gaseous medium because of its high heat transfer coefficient although air or other types of gas may be utilized. Prior to injection through the gas injection holes 50 into the inner cooling chambers 22, 24 and 26, the helium gas may be cooled to a predetermined temperature.

Figure 3:
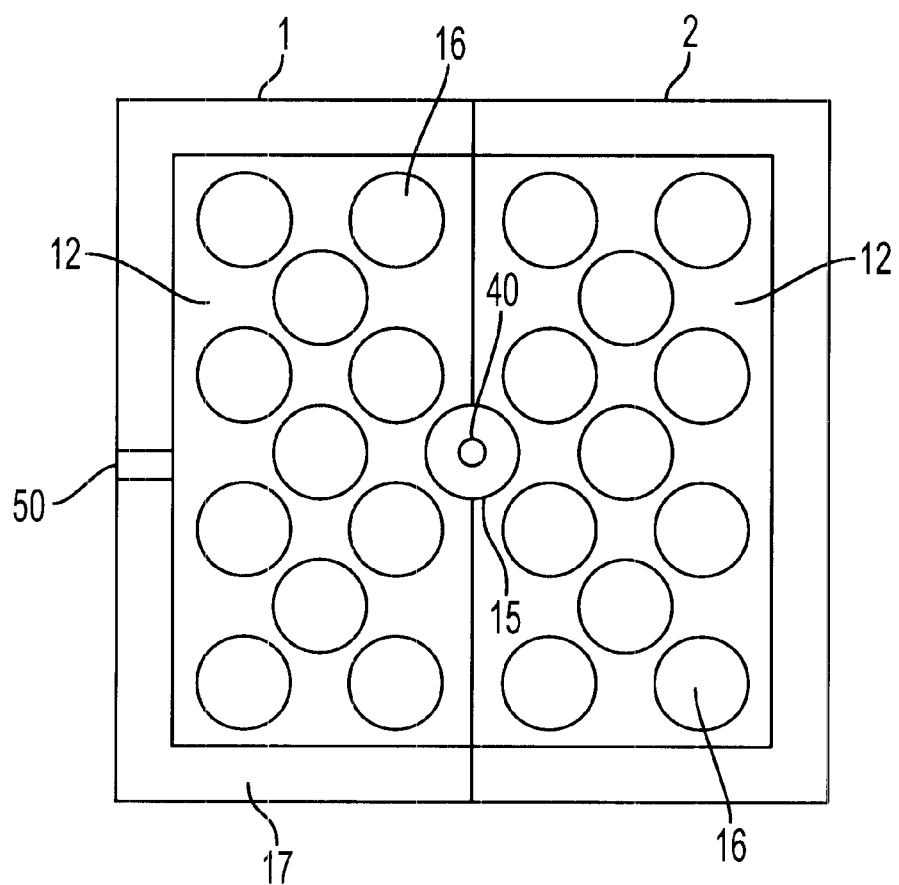
FIG. 3 illustrates a section view of the fiber cooling apparatus on line A—A' in FIG. 1.

Referring to FIGS. 1 and 3, the helium gas inside of the inner cooling chambers 22, 24 and 26 is cooled by twenty two copper pipes 16 (i.e., eleven pipes 16 in each of the two half shells 1 and 2 forming the housing body 20) through which a cooling liquid is circulated by coolant lines 4. That is, the helium gas transfers thermal energy from the optical fiber 40 to the outer walls of the copper pipes 16. Although the preferred embodiment utilizes twenty two copper pipes, any number of copper pipes 16 may be employed with the goal maximizing cooling effect (i.e., providing maximum number of the number copper pipes 16 in the space available inside of the inner cooling chambers 22, 24 and 26). The copper tubes 16 are installed inside the housing body 20 and extend from the upper end 18 to the lower end 19 of the housing body 20 so that they run the full height of the cooling device 10. In the preferred embodiment, a refrigerant mixture of water and Ethylene Glycol at a ratio of 1:1 is circulated through the copper pipes 16 to remove heat from the helium gas. Prior to entering the cooling device 10, the mixture of water and Ethylene Glycol is chilled to a predetermined temperature, zero degrees Celsius in the preferred embodiment, by a refrigerant cooling unit (not shown) which circulates the refrigerant mixture through the cooper pipes 16. By utilizing a large number of copper pipes 16 (e.g., twenty two), an enlarged heat exchange surface is provided. The low temperature of the refrigerant mixture circulated through the copper pipes 16 combined with greater surface exchange provided by the large number of copper pipes 16 results in a lower consumption of transfer fluid (refrigerant) as compared with conventional cooling devices. The separating walls 12 provide structural stability to the copper tubes 16 by maintaining the straightness of the copper tubes 16 throughout the length of the housing body 20.

As shown in FIGS. 1 and 3, the copper pipes 16 are positioned between the gas injection holes 50 through which the helium gas is injected into each of the inner chambers 22, 24, and 26 and the axial through hole 15 through which the optical fiber 40 passes. More particularly, the pipes 16 are positioned so that a line cannot extend from the injection holes 50 to the axial through hole 15. Therefore, the gaseous medium is prevented from being blown directly against the optical fiber 40 as it passes through the inner cooling chambers 22, 24 and 26. As a result, vibration of the optical fiber 40 is greatly reduced thereby permitting the diameter of the axial through hole 15 to be reduced in size as compared to conventional cooling devices. Further, the smaller size of the axial through hole 15 allows the helium gas surrounding the optical fiber 40 to-be stripped away as the optical fiber 40 passes through the separating walls 12 between the inner cooling chambers 22, 24 and 26 thereby maximizing the cooling efficiency per unit consumption of coolant gas.

In the preferred embodiment, the side walls 17 of the housing body are made of aluminum while the upper and lower end portions 18 and 19 are made of brass. Insulating plates 14 are disposed between the side walls of the housing body and the upper and lower end portions 18 and 19 of the housing body 20. Together with the insulated separating walls 12, the insulating plates 14 help prevent condensation from forming on the outer surface of the housing body 20 by preventing direct contact between the cool parts and the frame (i.e., the side walls 17 and the upper and lower end portions 18 and 19) the of the cooling device 10. Further, insulation (not shown), e.g., insulating tape, may be provided the outer surface of the side walls 17 and the upper and lower end portions 18 and 19 of the cooling device 10 to prevent the formation of condensation. Accordingly, water is prevented from dripping down onto the optical fiber 40 as it is passed through the cooling device 10.

In operation, the helium gas is simultaneously injected into each of the inner cooling chambers 22, 24 and 26 via the gas injections holes 50 while the coolant liquid is circulated through the copper pipes 16 to cool the helium gas. The optical fiber 40 drawn from an optical fiber preform (not shown) enters the cooling device 10 via the axial through hole 15 at the upper end 18 of the housing body 20. As the optical fiber 40 is transported through the first inner cooling chamber 22, the helium gas in the first inner cooling chamber 22 absorbs heat from the optical fiber 40 thereby reducing the temperature of the optical fiber 40. In other words, heat is extracted from the optical fiber 40 to the copper pipes 16 by the helium gas injected into the inner cooling chambers 22, 24 and 26. As the optical fiber passes through the separating wall 12 into the second inner cooling chamber, the helium gas surrounding the optical fiber 40 is stripped away resulting in greater heat exchange. Similarly, the helium gas in the second and third inner cooling chambers 24 and 26 absorbs heat from the optical fiber 40 as it passed through the second and third inner cooling chambers 24 and 26. Because the optical fiber 40 is sequentially cooled as it passes through each of the inner cooling chambers 22, 24 and 26, it follows that the helium gas in the first inner cooling chamber 22 will be warmer than the helium gas in the second inner cooling chamber 24 since the temperature of the optical fiber 40 is reduced by the first inner cooling chamber 22 prior to entering the second inner cooling chamber 24. Similarly, the helium gas in the second inner cooling chamber 24 will be warmer than the helium gas in the third inner cooling chamber 26 since the temperature of the optical fiber 40 is reduced by the first and second inner cooling chambers 22 and 24 prior to entering the third inner cooling chamber 26. In other words, the since the optical fiber is warmest when it enters the first cooling chamber 22, the helium gas in the first inner cooling chamber 22 will absorb more heat than the helium gas in the second inner cooling chamber 24. As a result, the temperature of the optical fiber 40 is sequentially reduced as it passed through each of the inner cooling chambers 22, 24 and 26.

In order to initiate the cooling operation of the optical fiber 40 using the cooling device 10, it is necessary to properly align the axial through hole 15 of the housing body 20 with optical fiber prior to closing the two half shells 1 and 2 which form the housing body 20. Initially, the draw speed of the optical fiber 40 is increased to a predetermined speed at which point one of the half shells 1 of the cooling device 10 is closed and the portion of the closed half shell 1 corresponding to the axial through hole 15 is aligned with the optical fiber. Next, the draw speed and the tension of the optical fiber is increased. It should be noted that the draw speed and the tension of the optical fiber 40 have a linear relation wherein as the draw speed increases the tension also increases. When the draw speed reaches a second predetermined level, the other half shell 2 is closed. By waiting for the draw speed of optical fiber 40 to reach the second predetermined level, it is possible to ensure that the optical fiber 40 is under proper tension in order to maintain the straightness of the optical fiber 40 and prevent vibration. The helium gas is then injected through the gas injection holes 50 into each of the inner cooling chambers 22, 24 and 26 and the cooling liquid is circulated through the copper tubes 16 to begin the cooling operation.

Although certain preferred embodiments of the present invention have been described, the spirit and scope of the invention is by no means restricted to what is described above. For example, although the preferred embodiment as been described with reference to a housing body having three inner cooling chambers, additional chambers may be employed by adding additional partition walls inside the housing body. Further, the cooling apparatus and method of the present invention may be employed on a coated or uncoated optical fiber.

What is claimed is:

1. An apparatus for cooling an optical fiber comprising:
   an housing body comprising a plurality of inner cooling chambers, a plurality of gas injection holes through which-gas is injected into each of the inner cooling chambers, and an axial through hole for the axial passage therethrough of an optical fiber to be cooled, said axial through hole extending through each of the inner cooling chambers; and
   a plurality of coolant pipes through which a liquid coolant flows to remove heat from said inner cooling chambers, said coolant pipes extending through each of said inner cooling chambers and being disposed between said gas injection holes and said axial through hole so that the gas which injected into the inner cooling chambers through the gas injection holes is not blown directly on said optical fiber.

2. An apparatus for cooling an optical fiber as claimed in claim 1, wherein said housing body further comprises a plurality of partition walls interposed between adjacent ones of said inner cooling chambers to separate said adjacent ones of said inner cooling chambers from each other, said axial through hole and said coolant pipes passing through each of said partition walls.

3. An apparatus for cooling an optical fiber as claimed in claim 2, wherein said partition walls are formed of an insulating material.

4. An apparatus for cooling an optical fiber as claimed in claim 1, wherein said housing body comprises two hingedly connected half shells which are closed together to form said housing body.

5. An apparatus as claimed in claim 1, wherein said liquid coolant which flows through said coolant pipes comprises a mixture of water and Ethylene Glycol.

6. An apparatus for cooling an optical fiber as claimed in claim 1, wherein said mixture of water and Ethylene Glycol is chilled to a temperature of zero degrees Celsius.

7. An apparatus for cooling an optical fiber as claimed in claim 1, wherein said gas which is injected through said gas injection holes into each of said inner cooling chambers is helium.

8. An apparatus as claimed in claim 1, wherein said housing body comprises a plurality of side walls in which said gas injection holes are disposed, an upper end portion through which said optical fiber is introduced to said axial through hole, a lower end portion through which said optical fiber exits said axial through, and a plurality of insulating plates disposed between the side walls and the upper and lower end portions.

9. An apparatus for cooling an optical fiber as claimed in claim 8, wherein outer surfaces of the side walls and the upper and lower end portions of the housing body are covered with an insulating material.

10. An apparatus for cooling an optical fiber comprising:
    an housing body comprising a plurality of inner cooling chambers, a plurality of gas injection holes through which gas is injected into each of the inner cooling chambers, and an axial through hole for the axial passage therethrough of an optical fiber to be cooled, said axial through hole extending through each of the inner cooling chambers; and
    a plurality of coolant pipes through which a liquid coolant flows to remove heat from said inner cooling chambers, said coolant pipes extending through each of said inner cooling chambers and being disposed between said gas injection holes and said axial through hole so that the flow of the gas injected into the inner cooling chambers through the gas injection holes is disrupted by the coolant pipes to prevent the gas from being blown directly on the optical fiber.

11. An apparatus for cooling an optical fiber as claimed in claim 10, wherein said housing body further comprises a plurality of partition walls interposed between adjacent ones of said inner cooling chambers to separate said adjacent ones of said inner cooling chambers from each other, said axial through hole and said coolant pipes passing through each of said partition walls.

* * * * *